(12) United States Patent
Bar-Gadda (10) Patent No.: US 7,384,619 B2
(45) Date of Patent: Jun. 10, 2008

(54) METHOD FOR GENERATING HYDROGEN FROM WATER OR STEAM IN A PLASMA

(75) Inventor: Ronny Bar-Gadda, Palo Alto, CA (US)

(73) Assignee: Bar-Gadda, LLC, Palo Alto, CA (US)

( * ) Notice: Subject to any disclaimer, the term of this patent is extended or adjusted under 35 U.S.C. 154(b) by 833 days.

(21) Appl. No.: 10/632,708

(22) Filed: Aug. 1, 2003

(65) Prior Publication Data

US 2004/0265137 A1    Dec. 30, 2004

Related U.S. Application Data

(60) Provisional application No. 60/484,084, filed on Jun. 30, 2003.

(51) Int. Cl.
*C01B 13/02* (2006.01)
*C01B 3/04* (2006.01)

(52) U.S. Cl. .................... 423/579; 423/658.2
(58) Field of Classification Search ............ 423/648.1, 423/658.2, 579
See application file for complete search history.

(56) References Cited

U.S. PATENT DOCUMENTS

| | | | |
|---|---|---|---|
| 4,053,576 A * | 10/1977 | Fletcher | 423/579 |
| 4,105,528 A | 8/1978 | Hasebe | |
| 4,107,008 A | 8/1978 | Horvath | |
| 4,342,738 A * | 8/1982 | Burgund | 204/157.5 |
| 4,419,329 A | 12/1983 | Heller | |
| 5,397,559 A * | 3/1995 | Kogan | 423/579 |
| 6,245,309 B1 | 6/2001 | Etievant et al. | |
| 6,521,205 B1 | 2/2003 | Beck | |
| 6,726,893 B2 * | 4/2004 | Lee et al. | 423/658.2 |
| 2002/0100836 A1 | 8/2002 | Hunt | |
| 2003/0059353 A1 | 3/2003 | Wootan et al. | |
| 2005/0150164 A1 * | 7/2005 | Wootan et al. | 48/210 |

FOREIGN PATENT DOCUMENTS

| | | | |
|---|---|---|---|
| JP | 56-17902 | * | 2/1981 |
| RU | 2 167 958 C2 | | 5/2001 |
| RU | 2 175 027 C2 | | 10/2001 |
| WO | WO 01/09031 A1 | | 2/2001 |

OTHER PUBLICATIONS

Pyle, et al, Direct Solar-Thermal Hydrogen Production from Water Using Nozzle/Skimmer and Glow Discharge, Oct. 29, 2000, 18 pages, H-Ion Solar Company, Richmond, California.
Lafon, et al, Hydrogen Production by Thermal Plasma Water Splitting, Jul. 25, 2003, 13 pages, EHEC 2003—CP1/135, Laboratori de Chimie des Plasmas, Limoges Univ.,Cedex, FR.

* cited by examiner

*Primary Examiner*—Wayne A. Langel
(74) *Attorney, Agent, or Firm*—Edward S. Wright (57) ABSTRACT

Water molecules, preferably in the form of steam or water vapor, are introduced into a plasma. The plasma causes the water molecules to dissociate into their constituent molecular elements of hydrogen and oxygen. To prevent recombining of the constituent molecular elements, the hydrogen and oxygen are separated from each other. Various devices may be employed to effect this separation. Once separated, the molecular components are prevented from recombining with each other or with other elements by using standard separation techniques normally employed for separating dissimilar gaseous species.

61 Claims, 11 Drawing Sheets

METHOD FOR GENERATING HYDROGEN FROM WATER OR STEAM IN A PLASMA

RELATED APPLICATION DATA

The present application claims the benefit of provisional application Ser. No. 60/484,084, filed Jun. 30, 2003.

BACKGROUND OF THE INVENTION

It is well documented in the field of exploration and production of fossil fuels that worldwide oil reserves are finite and being rapidly depleted. Oil production in the United States reached a peak circa 1970 and is rapidly declining. Outside the United States, It is presently believed that peak oil production will reach a climax in approximately ten to fifteen years.

However, despite knowledge of the finiteness of the known reserves, demand for oil production and consumption continues to escalate due to increasing demands for energy within and outside the United States. Accordingly, despite short term price fluctuations in the commodity markets, it is expected that the price of oil will continue to escalate as known oil reserves become increasingly scarce. Eventually the price of oil will become too great to provide reasonably priced energy to fuel the global economy, thereby resulting in severe economic contraction of worldwide output of goods and services.

In addition to the increase in oil prices relating to the increasing scarcity of this commodity in view of increasing demand, the majority of known oil reserves are located in countries that are politically unstable. A government or cartel hostile to world economic growth could hold industrialized countries ransom to its oil by refusing to export its oil or charging ludicrously high prices. Sudden instability of oil production or price due to such hostilities is forecast and modeled to cause great economic rifts in our society. It is therefore important that we increase our reliance and resources on sources of energy that are readily available and renewable.

Other concerns regarding the use of fossil fuels are related to environmental factors. For example, the burning of fossil fuels produces carbon dioxide ($CO_2$) and smog producing compounds, such as unburned hydrocarbons and oxides of nitrogen, which are generally released into the atmosphere. It is known that increasing concentrations of $CO_2$ in the atmosphere have resulted in climatic changes, notably global warming. It is further been predicted that global warning may also eventually cause severe rifts in the global society through the loss of arable land needed to feed an ever-increasing global population. Furthermore, global warming is further causing melting of polar ice caps, thereby raising sea levels resulting in further loss of land for increasing populations.

One such source of energy that is readily abundant and renewable is hydrogen. On a weight basis, hydrogen possesses three times more energy than an equivalent weight of gasoline. There are several known methods of producing hydrogen, for example, coal gasification, partial oxidation of oil, steam methane reforming, and biomass gasification, among others. Although these methods have been shown to be efficacious in the generation of hydrogen, a significant disadvantage and limitation in each of these methods is the co-production of carbon dioxide, which as discussed above is a leading cause of global warming.

An alternative process technology that does not have carbon dioxide as a byproduct is the electrolysis of water. High purity hydrogen and oxygen can be produced using a relatively simple electrolysis method. However, a significant disadvantage and limitation of electrolysis is the high electrical power requirements needed to split water into constituent elements of hydrogen and oxygen. Many factors in the electrolysis method contribute to these power requirements.

For example, since water possesses a high dielectric constant, the resistance in the current path between the submersed electrodes is high. In addition, there is a mass transfer resistance at the electrodes due to the abrupt disruption of the electrolyte at the electrode surface from the evolution of gas. This disruption also increases the resistance to the flow of electrical energy.

Furthermore, the active surface area of the electrodes limits the electrolysis process. Accordingly, a need exists to overcome these inherent disadvantages and limitations of electrolysis to split water into its constituent elements of hydrogen and oxygen.

Water vapor discharges have been investigated by scientists for the purpose of understanding the reaction mechanisms of chemical reactions. The intermediates or free radicals that are formed during the reaction, were the main subject of interest in the historic literature. Another interest in the pursuit of water decomposition, was to find a process of generating hydrogen peroxide. These two paths are what motivated the study of this reaction in a plasma.

An early attempt (H. C. Urey and G. I. Levin, Jounal of the American Chemical Society, 3290-3293, Vol. 51, November, 1929), at understanding the reactions in dissociated water by the Wood's tube was the discovery that water vapor under the influence of an electric discharge dissociated water into hydrogen atoms and hydroxyl free radicals. They noted that the product gas consisted of ⅔ the amount in hydrogen for the conditions that were run in the experiments. The paper does not illustrate any process conditions nor the method of analysis of the gas mix. They also detected hydrogen peroxide in the water condensed in the trap. They attributed the excess hydrogen from the intermediate decomposition of the hydrogen peroxide product and not directly from the water vapor. They give support to this assertion by noting that past observations state that hydrogen peroxide is formed first and then further decomposed to simpler species. Experiments were conducted to determine the presence of hydrogen atoms and hydroxyl radicals, which was confirmed by the activity of the gas. They noted the products from the water vapor discharge were more active than if only hydrogen atoms were present. There was no conclusive proof of the existence of these species as cautioned by the Authors. Another group of investigators (R. A. Jones, W. Chan and M. Venugoplan, The Journal of Physical Chemistry, volume 73, number 11 page 3693-3697, November 1969) were motivated to investigate the formation of hydrogen peroxide using a low pressure microwave discharge. They investigated a range of process conditions using water vapor as the reactant and trapping the products of dissociation in a cold trap at very low temperatures. They determined the yield of hydrogen peroxide under varying conditions. P. J. Friel and K. A. Kreiger, Journal of the American Chemical Society, vol. 80, p. 4210-4215, 1958 investigated the recombination of the high voltage discharge products of water vapor. They used various surfaces in order to effect the recombination reactions and determine the final product composition. They principally focused on using the surface of silica gel to study recombination reactions. They discovered that silica gel did not catalyze the recombination of hydrogen atoms. They speculated that a surface was an active intermediate in the subsequent reactions. The recombination reaction was accompanied by a temperature increase and a green luminenscence on the surface of the gel. It was noted that under these conditions the prinicpal products of the reaction was H2 and O2. The reactions were conducted in a moderately high vacuum (<300 millitorr) and extremely low flow rates (<20 millimoles/hour). In addition, reactions of the water vapor discharge products in a liquid air trap were analyzed and studied. Hydrogen peroxide, water and hydrogen and oxygen were formed. The predominant product were water and hydrogen peroxide as well as hydrogen. Most further studies centered about optimizing the formation of hydrogen peroxide or studying the OH free radical.

SUMMARY OF THE INVENTION

According to the present invention, water molecules, preferably in the form of steam or water vapor, are introduced into a plasma. The plasma causes the water molecules to dissociate into their constituent molecular elements of hydrogen and oxygen. To prevent recombining of the constituent molecular elements, the hydrogen and oxygen are separated from each other. Various methods may be employed to effect this separation. Once separated, the molecular components are prevented from recombining with each other or with other elements by using standard separation techniques normally employed for separating dissimilar gaseous species.

BRIEF DESCRIPTION OF THE DRAWING

FIG. 7(a)-(d) are appendices A.1-A.4 referred to in the specification;

DESCRIPTION OF THE INVENTION

Plasma is often called the "fourth state of matter," the other three being solid, liquid and gas. A plasma is a distinct state of matter containing a significant number of electrically charged particles, this number being sufficient to affect its electrical properties and behavior. In an ordinary gas each atom contains an equal number of positive and negative charges wherein the positive charges in the nucleus are surrounded by an equal number of negatively charged electrons. Each atom in the ordinary gas is therefore electrically "neutral."

The gas becomes a plasma when the addition of heat or other energy causes a significant number of atoms to release some or all of their electrons. The remaining parts of those atoms are left with a positive charge, and the detached negative electrons are free to move about. The positively charged atoms and the resulting electrically charged gas are said to be "ionized." When enough atoms are ionized to significantly affect the electrical characteristics of the gas, it is a plasma.

In many cases interactions between the charged particles and the neutral particles are important in determining the behavior and usefulness of the plasma. The type of atoms in a plasma, the ratio of ionized to neutral particles and the particle energies all result in a broad spectrum of plasma types, characteristics and behaviors.

The plasma itself can be produced via several techniques and may further be continuous wave or pulsed. A water plasma may be created utilizing energy in the microwave, radio frequency or low frequency region. Frequencies from 50 Hz to 100 gHz may be used. Pressures from 1 mtorr to 1000 atmospheres can be used. In addition, arc plasmas may also be used to crack water to hydrogen in oxygen. Arc plasmas generally employ two electrodes as a means of completing the electrical path.

Accordingly, the present invention, as described herein, is not limited to any particular methodology to develop the plasma. Examples of plasma generation devices that may be used, but not limited to, are low pressure (non-equilibrium) plasmas, penning plasma discharge, radio frequency capacitive discharges, radio frequency inductively coupled plasmas, microwave generated plasma, D.C. electrical discharges, and inductively coupled discharges.

Figure 1:
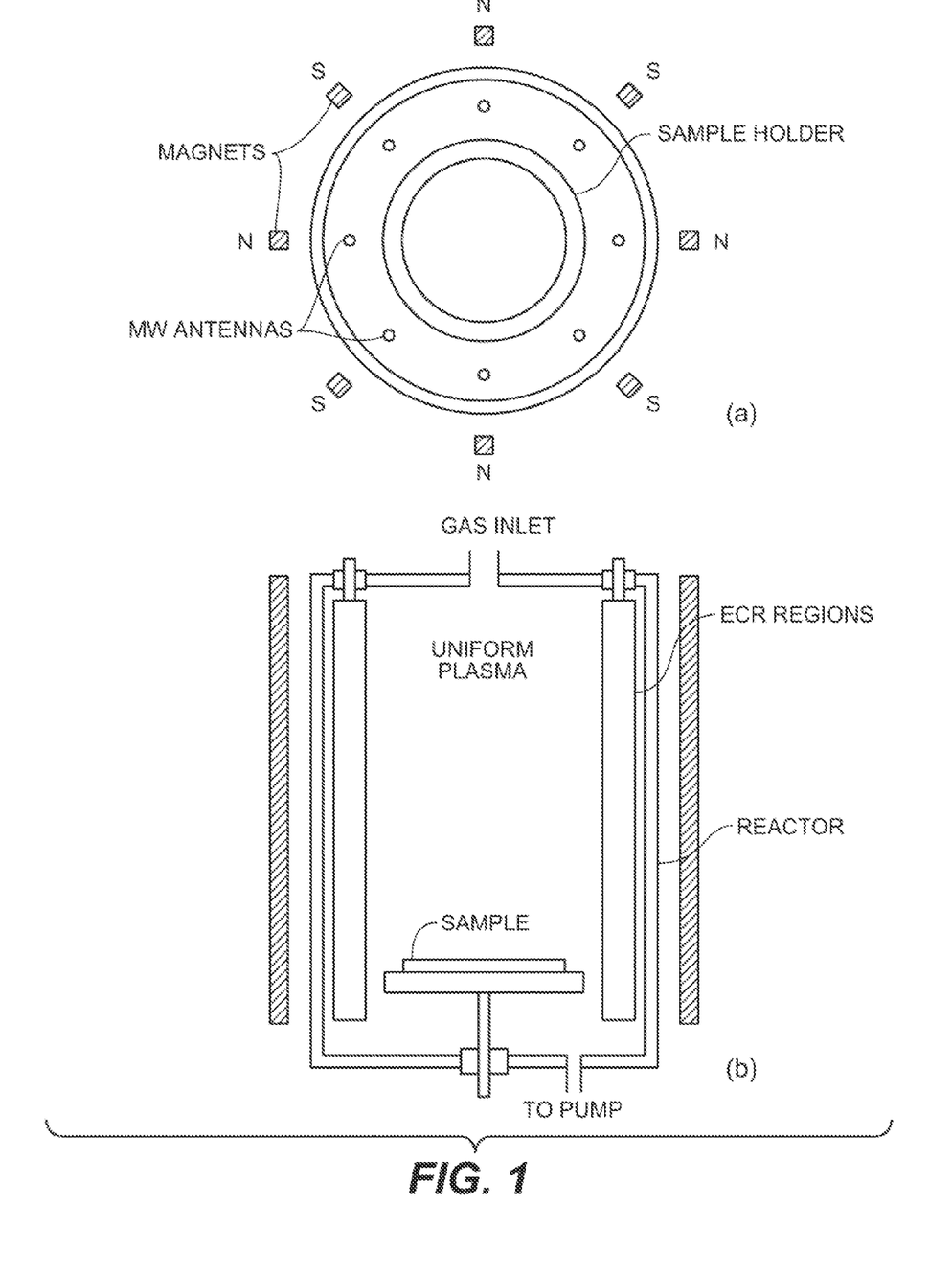
FIG. 1(a)-(b) is a cross sectional view of a multipolar ECR plasma reactor useful to practice the present invention.
Figure 2:
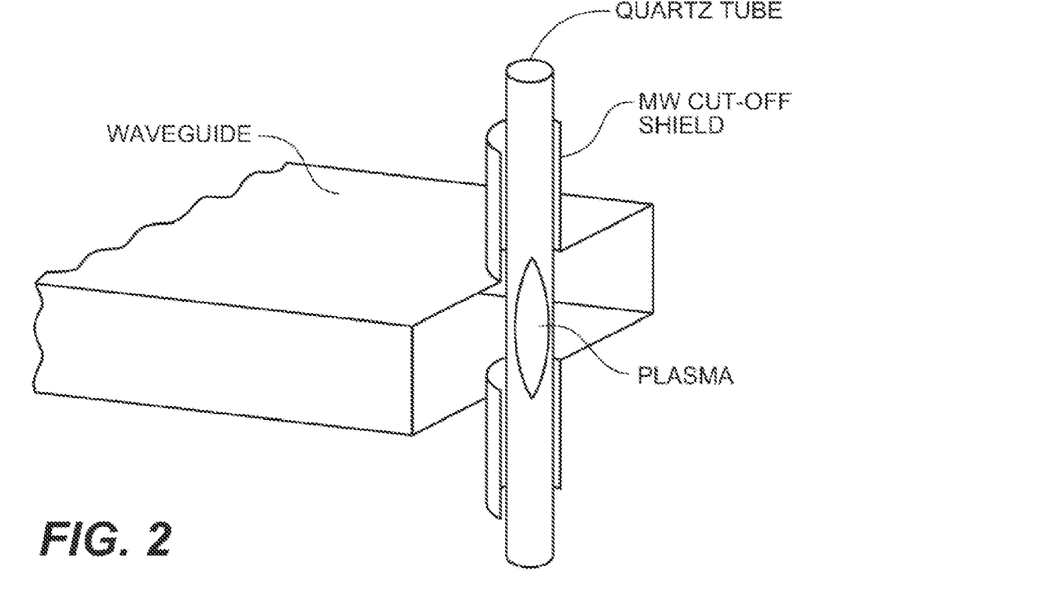
FIG. 2 is a fragmentary view of a waveguide tube microwave coupling for another plasma reactor.
Figure 3:
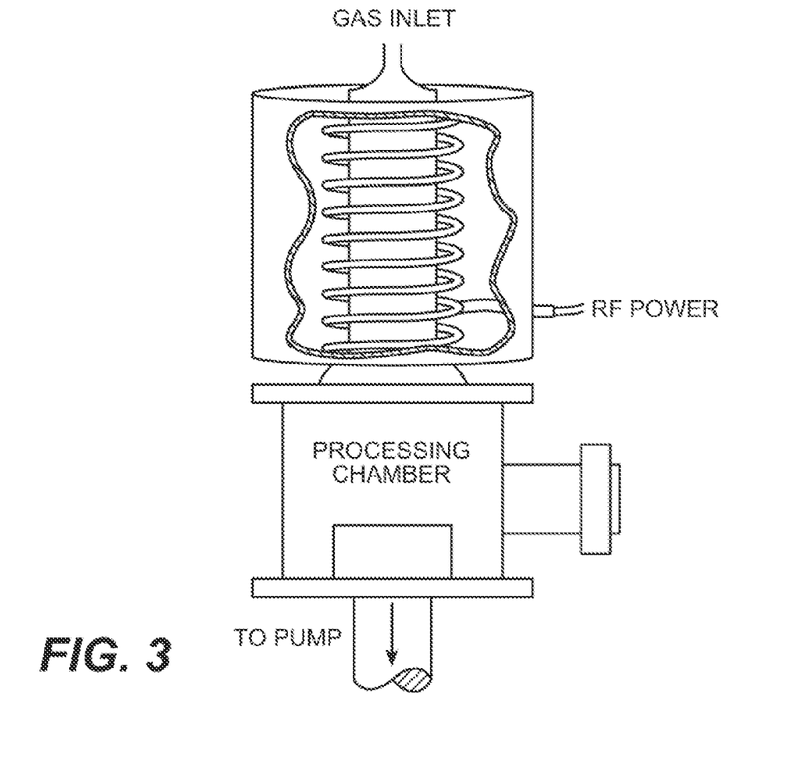
FIG. 3 is a fragmentary view of a plasma reactor with helical coil.
Figure 4:
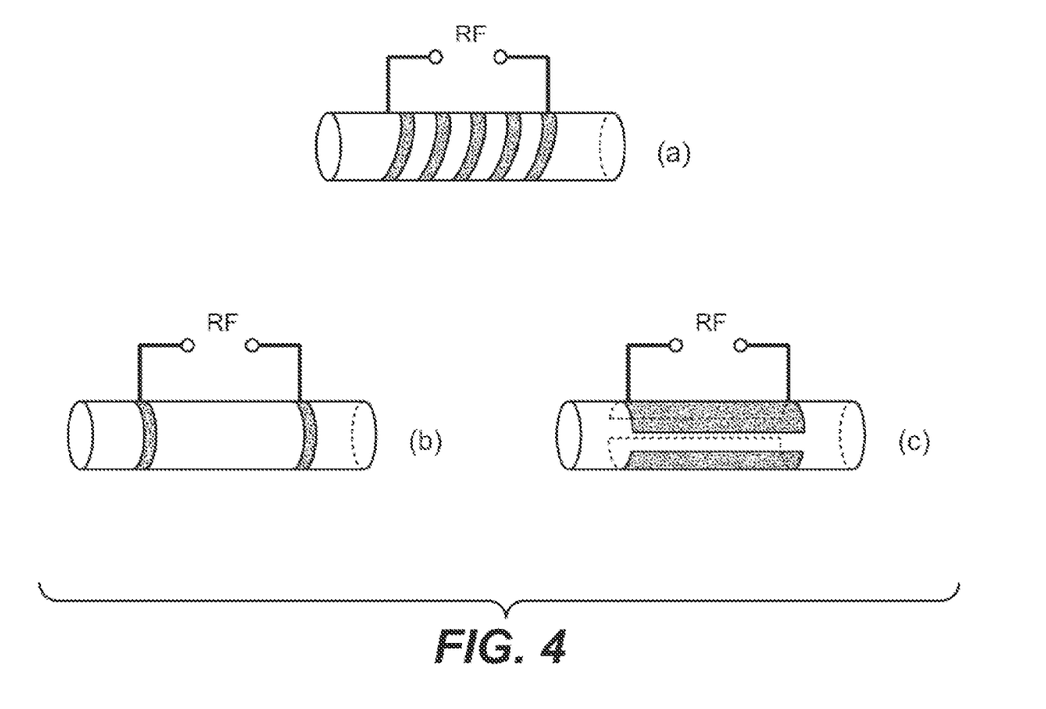
FIG. 4(a)-(c) illustrate several coupling methods to electrodeless plasma reactors.

Some specific examples of plasma reactors are shown. FIG. 1(a)-(b) illustrates a multipolar ECR plasma reactor. FIG. 2 shows a fragmentary view of a waveguide-tube microwave coupling reactor. FIG. 3 is yet another plasma reactor with a helical source. FIG. 4(a)-(c) illustrate several RF coupling methods to electrodeless plasma reactors.

In accordance with the present invention, water molecules, $H_2O$, are injected into the plasma. The water may enter into the liquid state or more preferably in the gaseous state in the form of a vapor such as steam. Furthermore, the water vapor or steam may be injected concurrently with other gases such as nitrogen, argon, helium, xenon, krypton, air, etc., in order to assist in the dissociation of the water into its constituent components. These components may be free radicals such as OH, H, $HO_2$, or their ionic counterparts such as OH−, OH+, H+, H−, etc.

FIGS. 7(a)-7(d) illustrate the equilibrium concentration of the various species as a function of temperature at a pressure of 1 bar, 10 bar, 0.1 bar and 0.01 bar, respectively, and an initial concentration of water vapor of one mole. In another embodiment, a gas possessing the property of easily dissociating into a plasma such as argon may be used in which the water vapor is injected into the argon plasma such that the resident time of the water vapor in the argon plasma is sufficient to affect dissociation. Other gasses of similar properties may be used such as helium or xenon.

In order for the constituent components that are formed in the dissociation process from reverting to their earlier state (water vapor) or recombining to form other materials, it is important that the reaction is frozen so that the dissociation is irreversible. Thus, in order to crack water to its molecular constituents, $H_2$ and $O_2$, without reverting back to water vapor, the reaction must be frozen or the constituent components of the plasma separated so that they do not recombine.

There are various techniques for isolating the components so that they will not recombine. One such technique uses a high temperature membrane within the reaction zone, the reaction zone being that part of the reactor where the plasma resides. Since temperatures within this zone may reach very high values, it is important that the membrane consist of material that can withstand that rigorous environment. Ceramic membranes that have a porosity that will allow the passage of one constituent and not another will permit the separation of hydrogen and oxygen. Other membranes such as ion transport membranes (ITM), Cermets, zeolites, sol gels, and dense ceramic materials (e.g., $BaCe_{0.8}Y_{0.2}O_3$-alpha (BCY)), among others, may be used. These materials may be biased with an electrical charge or not depending on the nature of the plasma formed.

Figure 5:
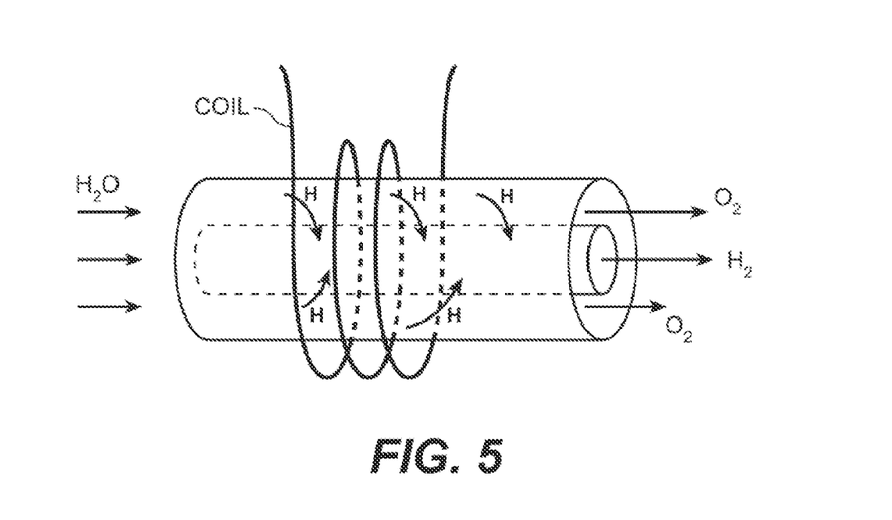
FIG. 5 is a perspective view of a separation apparatus used in a reaction zone of a plasma reactor to separate the water molecules into its molecular constituents.
Figure 8A:
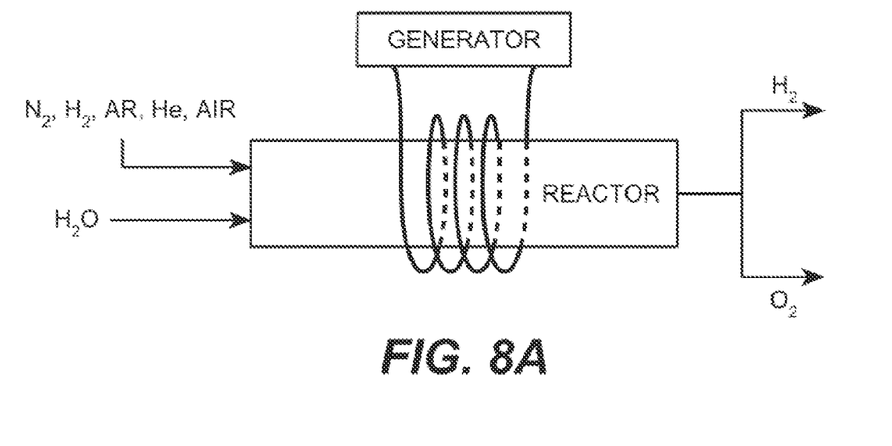
FIGS. 8A-8D diagrammatically illustrate apparatus useful to practice the separation methods of the present invention.

In one embodiment of the present invention, water vapor is admitted into the reaction zone or optionally along with an inert gas such as argon, as seen in FIG. 8A. As best seen in FIG. 5, there are two concentric tubes where the space between the outer surface of the inner tube and the inner surface of the outer tube is the plasma reaction zone. The plasma may be formed by using the RF coils as shown, or through numerous other methodologies as discussed above. The water vapor may be introduced in a number of configurations so that mixing with the plasma is sufficient to cause the water molecules to decompose to hydrogen and oxygen. The residence time of the water molecules in the plasma is long enough to cause the reactant water vapor to decompose. The configuration of the water vapor stream relative to the argon stream may be at any angle so long as the above criteria is established. Thus, a countercurrent stream of water relative to argon may be used. Other configurations such as co-current or at any angle such as 90 degrees as an example can be employed.

In order to make the reaction more economic, air or nitrogen may be substituted for an inert gas such as Argon. However, a potential by-product using nitrogen or air may be NO from the reaction, $N_2+O_2=2NO$. First, due to the difficulty of breaking the triple bond of nitrogen, the use of a seeding material as illustrated in this patent application may be employed. The seeding material will increase the conductivity of the plasma and thus, lower the temperature requirement of the plasma. The by-product NO may be used to increase the amount of hydrogen produced in the following way.

NO, nitric oxide possesses has a low boiling point, low ionization potential and high thermal stability. A variety of acids may be used. I illustrate the use of phosphoric acid as an example. The product NO issuing from the plasma reactor is contacted with a phosphoric solution as shown below:

Thus, hydrogen is generated from the phosphoric acid solution using NO. The phosphoric acid decomposes, releasing hydrogen, and forming nitrosonium phosphate (a salt). When water is added to the salt, the acid and one half of the nitric oxide is reconstituted. Heat is evolved. The NO2 is heated and broken down to NO for further recycling.

Thus,

The by-product O2 from the cracking of water and NO/phosphoric acid reaction may optionally be used in a recycle mode to make a more desirable 1:1 N:O charge with the incoming water vapor in order to optimize NO production by the reaction above.

The water vapor is introduced into the reaction zone at one end of the concentric tubes, as seen in FIG. 5. Inside the reaction zone, the water molecules are dissociated into their molecular constituents as described above. Due to the difference in diffusivities of hydrogen and oxygen, either component will diffuse preferentially through the outer surface of the inner tube into the inner tube. Since the radius of the hydrogen atom or molecule is smaller than the radius of the oxygen atom or molecule, the hydrogen species will preferentially diffuse through the wall of the inner tube, thus affecting separation.

The reaction zone will become increasingly rich in the oxygen species down the length of the reactor. Further separation outside of the reaction zone at the other end of the concentric tubes can be accomplished using standard separation techniques normally employed for separating dissimilar gaseous species.

The above description illustrates a single stage reactor/separator system. Each stage may be arranged in series or in parallel for a multistage system. In addition, there may be several stages of separation within the reaction zone by using multiple concentric tubes. There can be different combinations of series and parallel reaction zones with or without multiple tubes within each reaction zone in order to affect better separation or throughput of the product gasses.

Figure 8B:
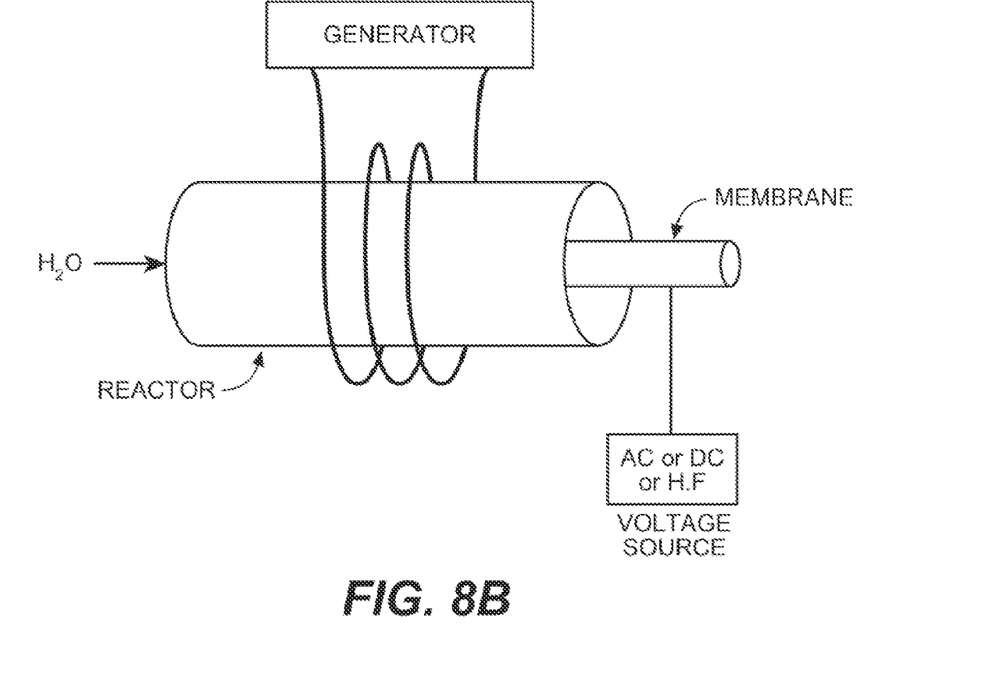

The inner tube of the apparatus shown in FIG. 5 may be a membrane which is biased by a DC, AC or high frequency voltage as shown in FIG. 8B. The membrane need not be tubular as show, but any suitable geometry may be utilized.

In another embodiment of the present invention, a converging diverging nozzle may be used to freeze the reaction after cracking of the water molecules into its constituent hydrogen and oxygen components so that the dissociated constituents do not recombine. Since gasses will diffuse inversely proportional to the square root of the molecular weight and the diffusion coefficient of hydrogen and oxygen are very different, separation of the hydrogen and the oxygen can be accomplished.

More particularly, the generation of molecular beams by means of expansion of gasses through a Laval nozzle is described by E. W. Becker and K. Bier in Z. Nauturforsch, vol. 9a, p. 975 (1954). As described therein, the enhancement of beam intensity is due to a diffusion process of such a nature as to cause the heavier constituent to concentrate along the core of the emerging beam. In terms of the directional distributions in intensity of the beam components, the heavier component is found to have a sharper maximum in the forward direction.

Figure 6:
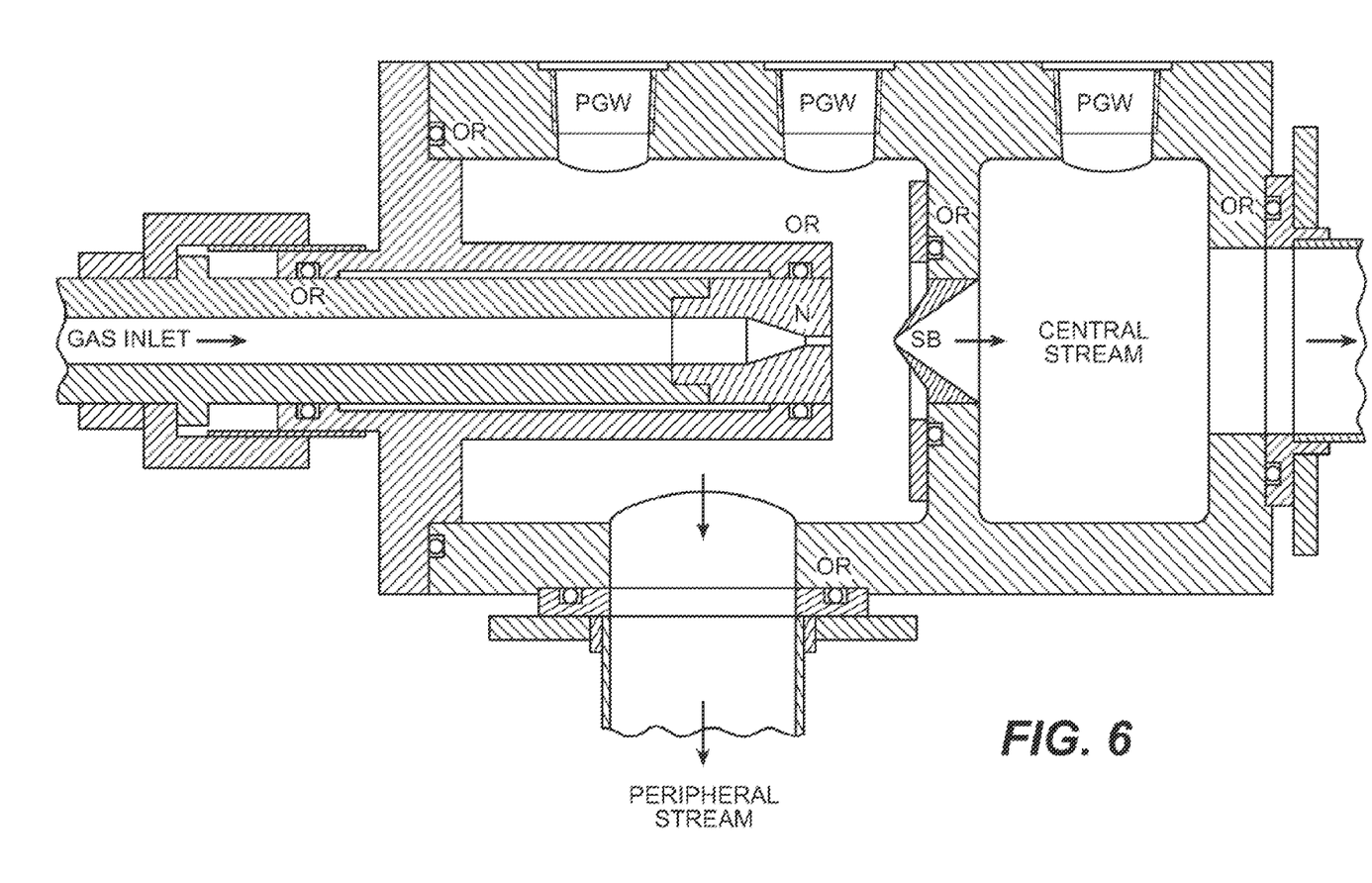
FIG. 6 is a cross sectional view of another type of separation apparatus useful to separate a gaseous stream into its molecular constituents.
Figure 7A:
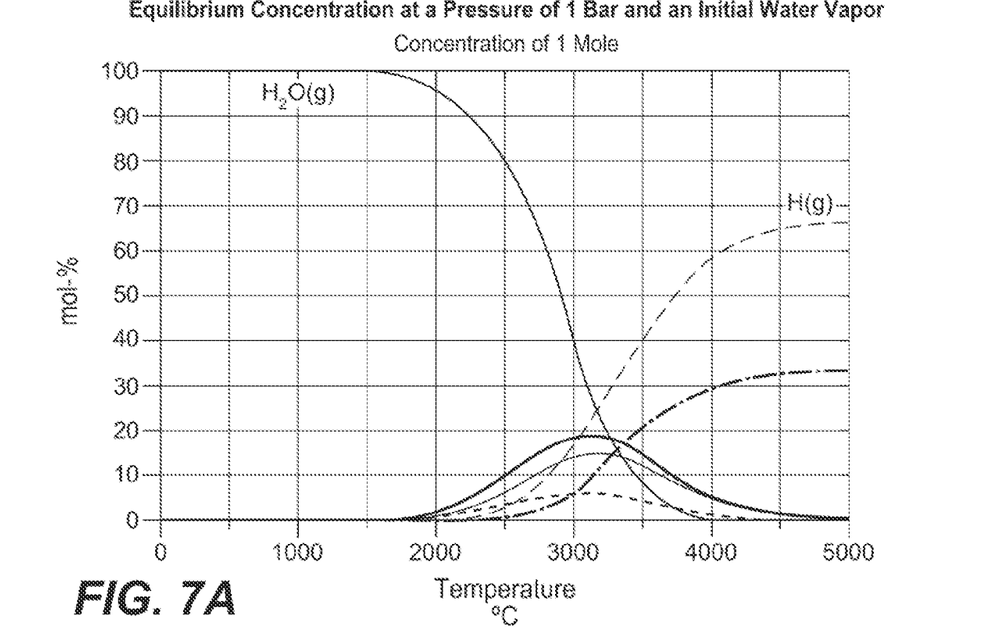
Figure 7B:
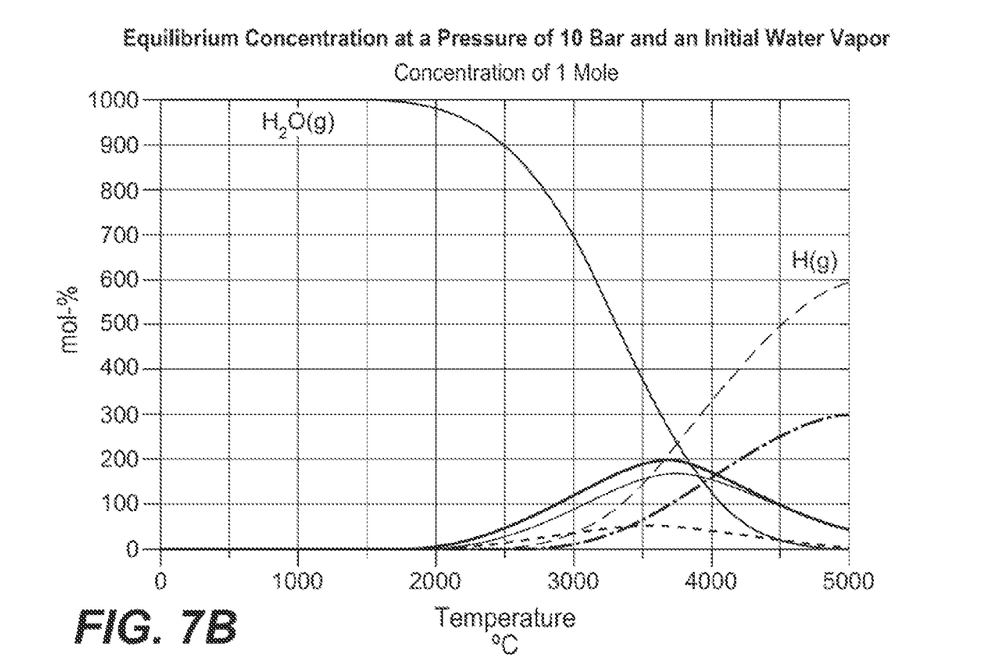
Figure 7C:
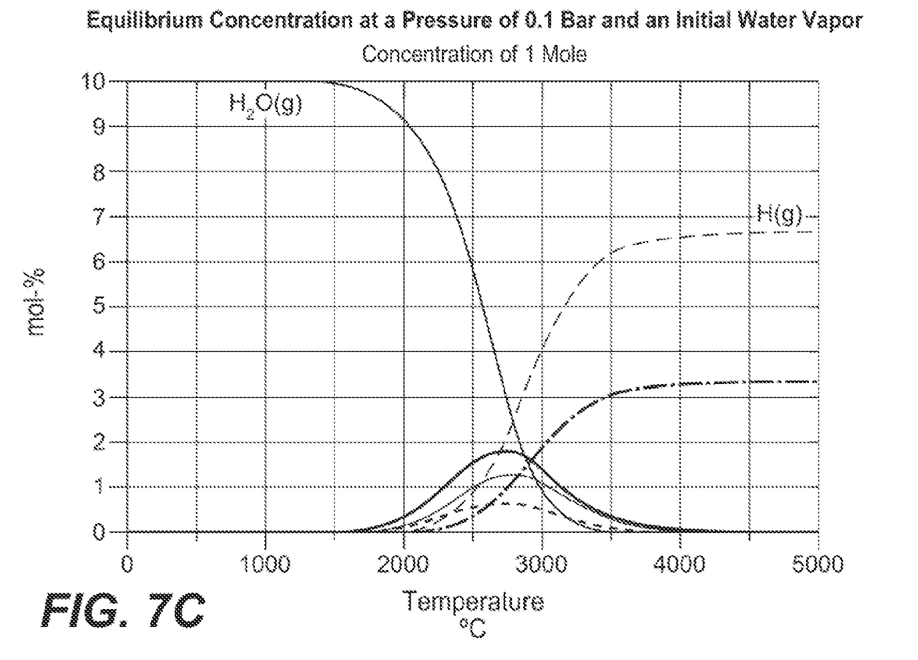
Figure 7D:
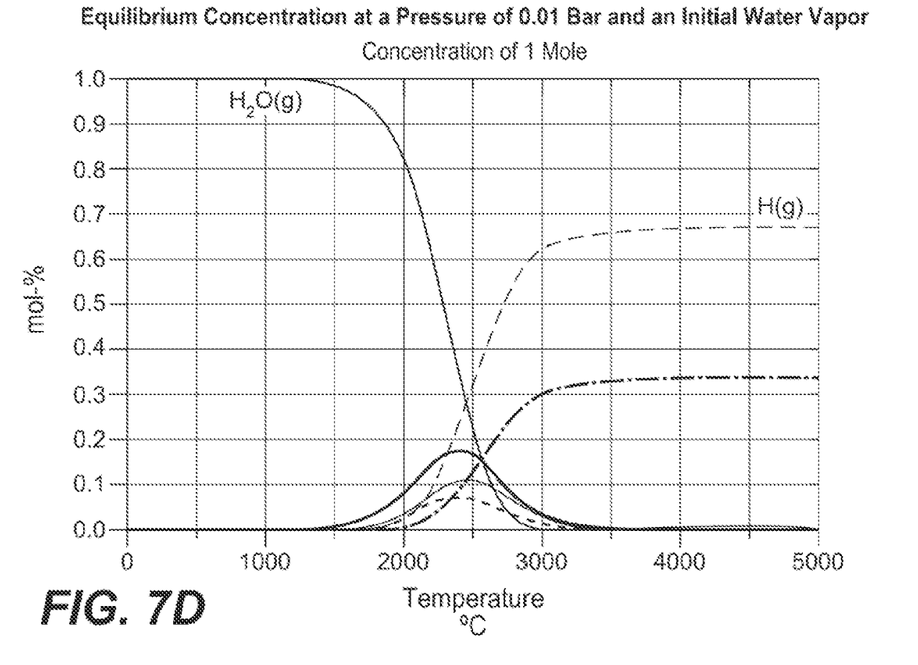

An example of a Laval nozzle is shown in FIG. 6, and is described in Waterman and Stern, J. Chemical Physics, vol. 31, no. 2, August 1959, pp. 405-419. As described by Waterman and Stern, in furtherance of the teachings of Becker and Bier, it is postulated that the composition gradients in the supersonic jet expansion of the molecular components is the result of the thermal diffusion of the lighter component, in this caser hydrogen, to the outer layers of the jet.

Figure 8C:
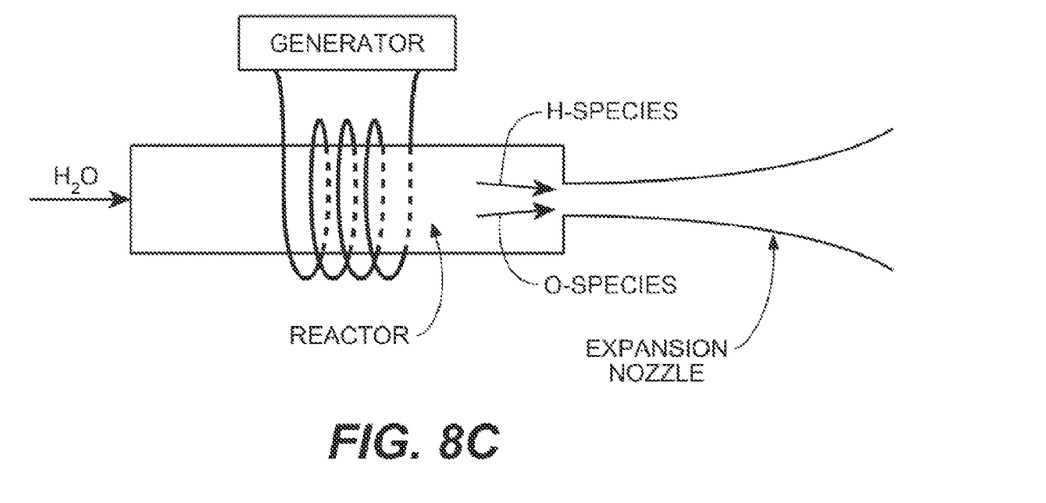

Alternatively to a converging diverging nozzle, an expansion nozzle may be used as seen in FIG. 8C. The expansion nozzle cools the exiting gasses to prevent recombination.

In another embodiment of the present invention, shock cooling via injection of another gas that will assist in the termination of the free radical process may also be used. In addition, cryogenic cooling maybe employed to assist in freezing the product gasses. The gases may also be frozen in composition by exiting the gases through an expansion nozzle, thus allowing the easier separation of the components.

Another method of terminating reactor species so that the predominant exit gasses are hydrogen and oxygen is through the use of a catalyst. If a substance, such as silica gel, with a sufficient surface area is present in the stream of the reactive components, the radical components will preferentially being redirected in the reaction pathway to hydrogen and oxygen.

Examples of catalyst that assist in the recombination of these components to the permanent gasses H2 and are platinum, salts and metals, zinc chromite, or other metal oxides, among others. Gas phase catalysts may also be employed effectively. A third body collision will favor the recombination of oxygen atoms or hydrogen atoms to form the molecular counterparts. For example, $O+O+M=O_2+M$, and $H+H+M=H_2+M$, where M may be any gas species not interfering in the reaction. An example of M is argon, xenon or any of the inert gases.

Other gasses may be employed. Precaution must be obeyed so that the gas phase catalyst does not participate in the reaction leading to a chemical reaction with it. An example is carbon monoxide, whereby a selective termination of one of the important intermediates leads to the production of hydrogen atoms. The hydrogen atoms may then be subsequently recombined with itself to form $H_2$ gas by any of the techniques discussed above. The reaction is $OH+CO=CO_2+H$.

In addition, material may be sacrificed in order to produce hydrogen atoms. If carbon is placed in the path of the reacting intermediates, the primary product is carbon monoxide, or $OH+C=CO+H$. Once again, hydrogen atoms may then be recombined by any other of the methods described above.

In another method of preventing the hydrogen and oxygen species from recombining, a third party component may inhibit the recombination reaction. An example of an inhibitor is iodine. Adding $I_2$ to the stream will inhibit the recombination of oxygen and hydrogen back to water. Care needs to be taken that heterogeneous effects do not predominate with this inhibitor that may impair the inhibitory nature of this component. W. A. Waters (Chemistry of Free Radicals, Oxford, 1946, page 89) and Norrish (Proceedings of the Royal Society, 1931, 135 p. 334) have taught that "Iodine . . . is an inhibitor of the hydrogen-oxygen reaction, since it reacts with the free atoms giving products, such as atomic iodine, which have too little intrinsic energy to interact either hydrogen or oxygen molecules." Furthermore, Morris and Pease (J. Chemical Physics, 1935, 3, p796) teach, $H+I_2=HI+I$. The net reaction enthalpy is exothermic giving 33.7 kcals. In addition, the energy of activation of this reaction is approximately 0 kcal. Hence under certain process conditions, the reaction is favorable and hence, these substitutions occur at practically every collision between a hydrogen atom and halogen molecule (e.g. iodine) even at room temperature. There are various methods to recover iodine to be used again.

Figure 8D:
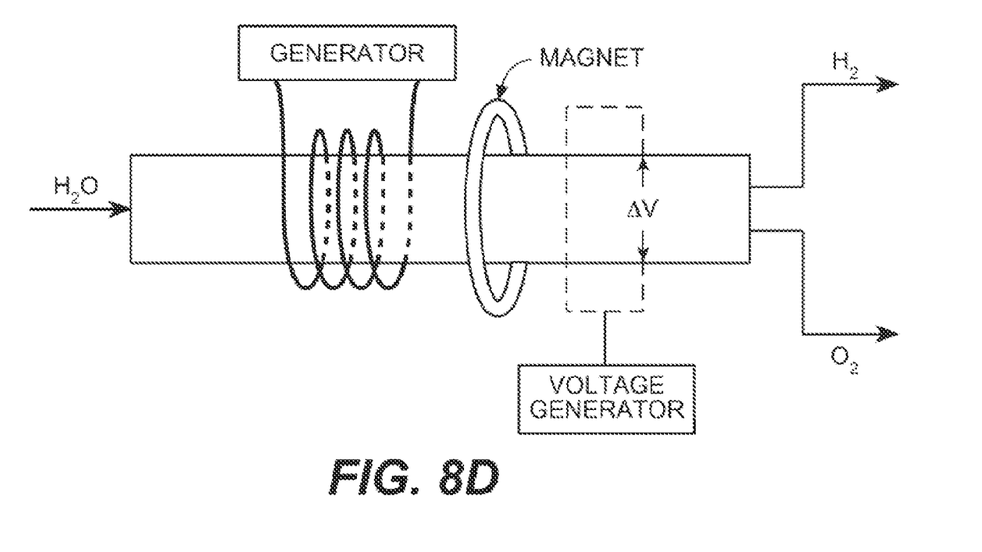

In another method for separation a magnetic field may be established in order to effect the separation of hydrogen and oxygen. An apparatus allowing the practice of this method is seen in FIG. 8D. Free radicals have magnetic moments and are thus influenced by external magnetic fields. Stern and Gerlach teach that the deflection of species is governed by the following equation:

$$X(v)=1/(2\epsilon)\mu_{eff}(\delta H/\delta x)1^2$$

Where, 1=length of the field
$\delta H/\delta x$=magnetic field gradient
$\epsilon$=kinetic energy of molecules
$\mu_{eff}=Mg\mu_0$(M can have values $-J, -J+1, \ldots J$; g is the Lande factor, and $\mu_0$ is the Bohr magnetron)

Thus, an inhomogenous magnetic field may be established under certain process conditions in order to separate the free radicals by their magnetic moments.

Furthermore, under certain conditions in the plasma, hydrogen and oxygen have dissimilar ionization potentials. Thus, by imposing a potential difference on the plasma, also as seen in FIG. 8D, it is possible to separate the species under certain specialized conditions due to the different ionic potentials of the ionized species. At very high temperatures the hydrogen and oxygen species become ionized and are influenced by the external voltage applied, thus promoting separation.

For stationary generation of hydrogen in large quantities, a source of water and electricity is needed. There are several sources that can be used that are found naturally. Geothermal sources provide both water vapor in the form of steam as a reactant for this device as well as a source of electricity. As shown in FIG. 10B, hydroelectric power may also be used to drive the device and the nearby water source may be used as a reactant. The portable form of this device may be used anywhere so long as there is a source of water and electricity.

Figure 10A:
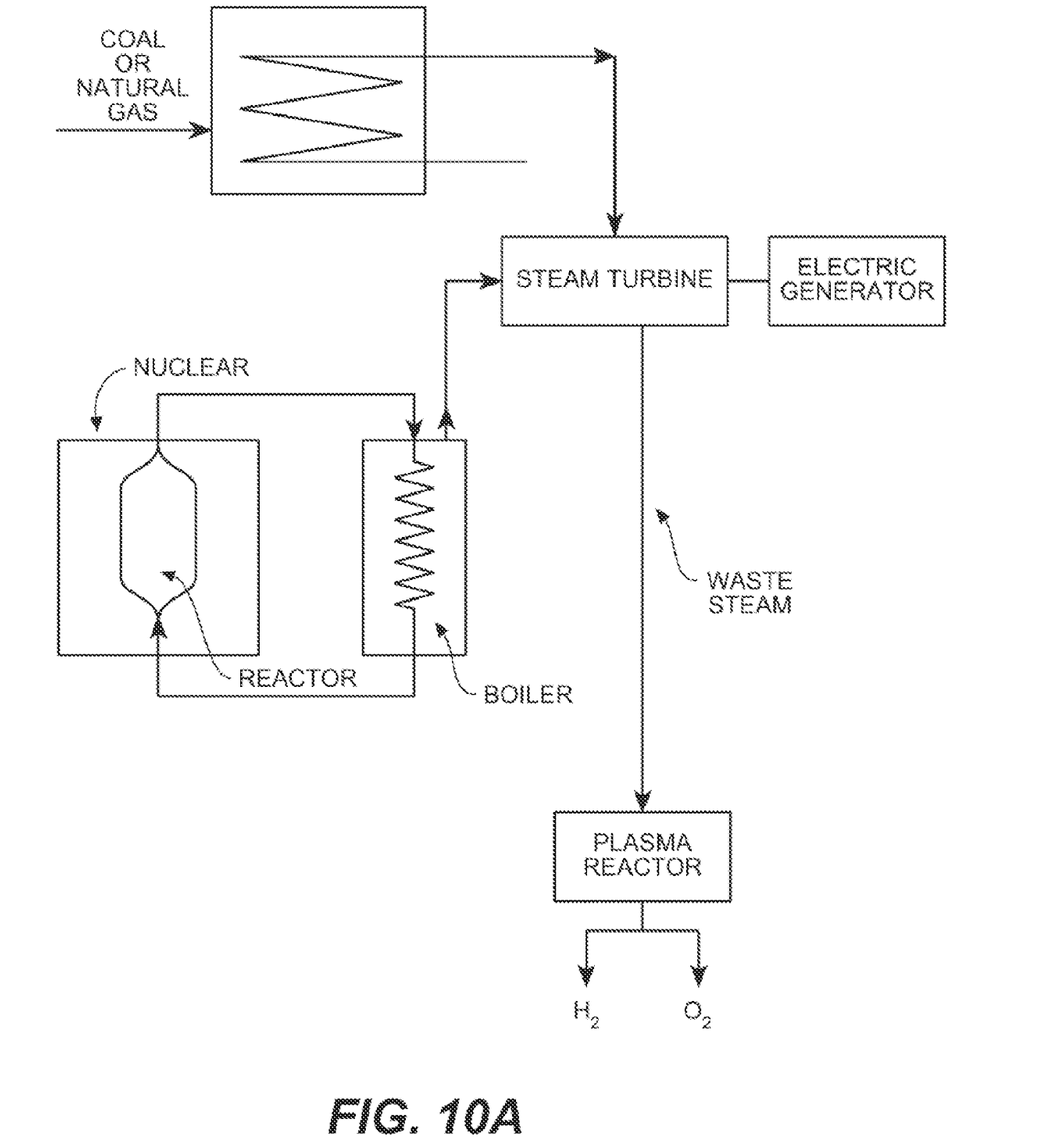
FIGS. 10A-10B diagrammatically illustrate apparatus useful to practice the energy recovery from waste methods of the present invention.
Figure 10B:
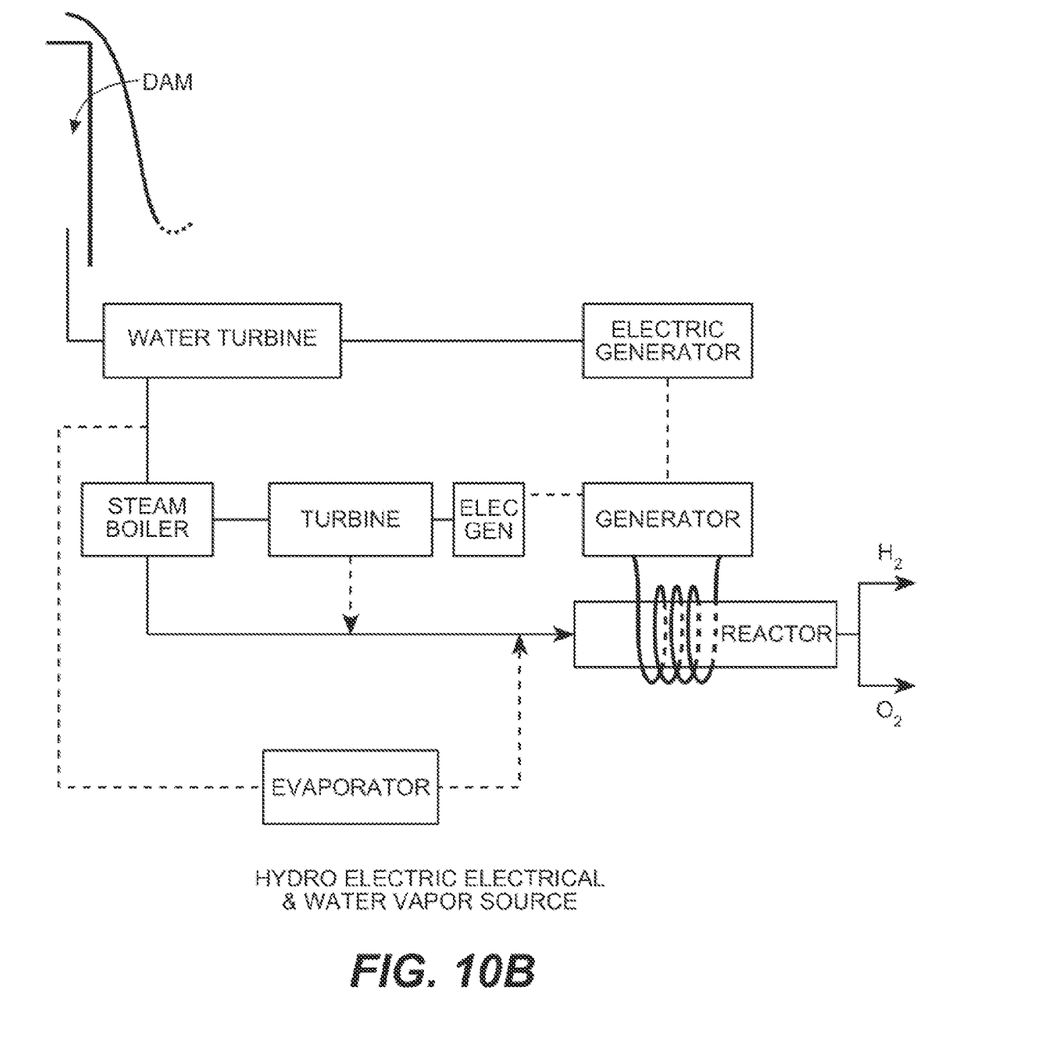

In addition, as shown in FIG. 10A, conventional power plants that use natural gas, coal, nuclear, or other fossil fuels as a source of heat to generate steam for electrical power, generate large quantities of waste steam that needs to be eliminated through condensation. This invention may use this waste steam as reactant material in order to generate hydrogen as an energy carrier. As an example, a small electrical power plant that generates 5,500 kw (Standard Handbook for Electrical Engineers, A. E. Knowlton, 9th Edition, McGraw-Hill Company, Section 10-43, page 920) is used for illustrative purposes. The extracted or waste steam in this example is 71,400 pounds per hour or 32,455 kgs/hour or approximately 1,803 kg-moles of hydrogen produced per hour. Assuming perfection conversion of the steam), the amount of hydrogen produced would be 894 kilograms of hydrogen per hour or 10,927 m$^3$/hour or 95,718,949 m$^3$/year.

Additionally, the plasma may be operated at lower power levels if it can be initiated more easily. The method that can increase the conductivity of the plasma and thereby lower the input power is called seeding. This class of materials possesses low ionization potentials. This means that substantial conductivities can be achieved at relatively low temperatures. The alkali and alkaline earth metals possess that property. For example, ionic salts from the alkali and alkaline earth metals are excellent candidates. Examples of such compounds are $CsCO_2$, $CsCl$, $K_2CO_3$, $KOH$, $KCl$, $NaCl$, $NaOH$, $Na_2CO_3$, and the like. Alternatively, mercury may be used as a seed material.

Figure 9A:
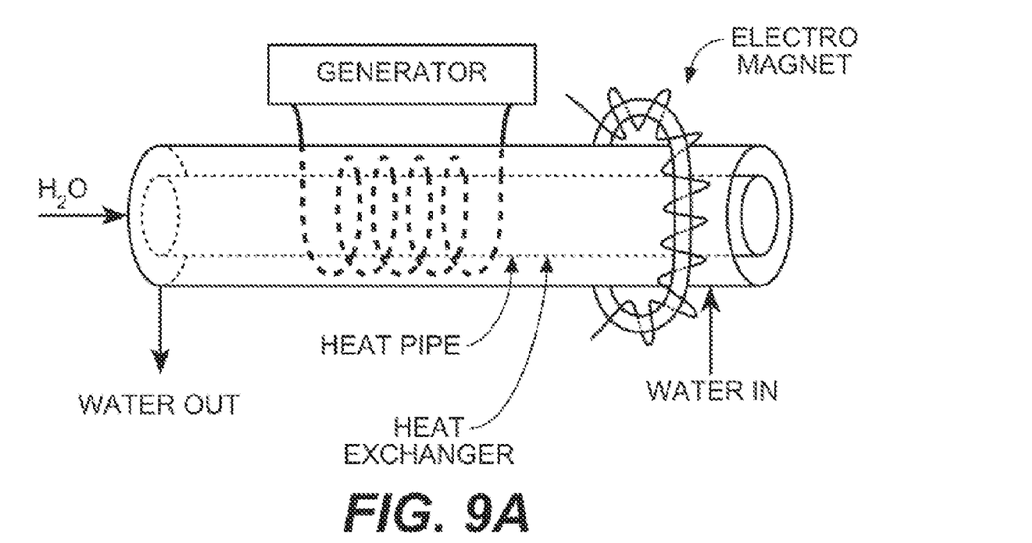
FIGS. 9A-9B diagrammatically illustrate apparatus useful to practice the energy recovery from the plasma methods of the present invention.
Figure 9B:
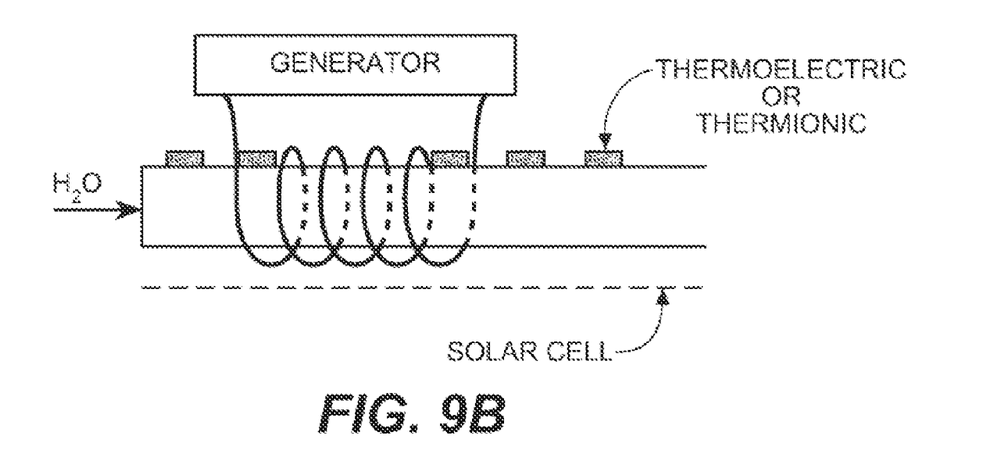

Plasmas in the higher pressure range will emit large quantities of heat and light. The heat is derived from a variety of sources such as the recombination reaction of hydrogen and oxygen. Recovery of that heat could be by means of heat exchange, heat pipes, as seen in FIG. 9A, or even photovoltaic cells, or thermoelectric or thermoionic devices, as seen in FIG. 9B. The heat recovered may be used to raise the temperature of the incoming reactant steam or water so that the plasma will utilize less energy in the cracking process. Since the plasma is electrically conductive, it is even possible to capture some of the electrical energy of the plasma using techniques common to MHD systems.

What is claimed as the invention is:

1. A method of generating hydrogen and oxygen gas, comprising steps of: injecting water molecules into a plasma to dissociate the molecules into a hydrogen species and an oxygen species, separating the hydrogen species from the oxygen species within the plasma, and removing each of the oxygen species and the hydrogen species from the plasma so that the hydrogen species forms gaseous hydrogen and the oxygen species forms gaseous oxygen.

2. A method of generating hydrogen and oxygen gas, comprising steps of: generating a plasma in the microwave frequency segment of the electromagnetic spectrum, injecting water molecules into the plasma to dissociate the molecules into a hydrogen species and an oxygen species, separating the hydrogen species from the oxygen species within the plasma, and removing each of the oxygen species and the hydrogen species from the plasma so that the hydrogen species form gaseous hydrogen and the oxygen species form gaseous oxygen.

3. A method of generating hydrogen and oxygen gas, comprising steps of: generating a plasma in the radio frequency segment of the electromagnetic spectrum, injecting water molecules into the plasma to dissociate the molecules into a hydrogen species and an oxygen species, separating the hydrogen species from the oxygen species within the plasma, and removing each of the oxygen species and the hydrogen species from the plasma so that the hydrogen species form gaseous hydrogen and the oxygen species form gaseous oxygen.

4. A method of generating hydrogen and oxygen gas, comprising steps of: generating a plasma from low frequency electromagnetic waves, injecting water molecules into the plasma to dissociate the molecules into a hydrogen species and an oxygen species, separating the hydrogen species from the oxygen species within the plasma, and removing each of the oxygen species and the hydrogen species from the plasma so that the hydrogen species form gaseous hydrogen and the oxygen species form gaseous oxygen.

5. A method of generating hydrogen and oxygen gas, comprising steps of: generating a plasma from an arc discharge, injecting water molecules into the plasma to dissociate the molecules into a hydrogen species and an oxygen species, separating the hydrogen species from the oxygen species within the plasma, and removing each of the oxygen species and the hydrogen species from the plasma so that the hydrogen species form gaseous hydrogen and the oxygen species form gaseous oxygen.

6. The method of claim 1 including the step of developing an electromagnetic field from a source of electrical energy to define a plasma reaction zone, with the water molecules being injected into the plasma reaction zone.

7. The method of claim 6 wherein the electrical energy is developed from at least one of the following: solar energy, hydroelectric energy and geothermal energy.

8. The method of claim 6 wherein the electrical energy is developed from a hydroelectric source, and at least a portion of water used by the hydroelectric source is recovered for use as the water molecules which are injected into the plasma.

9. The method of claim 6 wherein the electrical energy is developed from a geothermal source in which water vapor is emitted, and at least a portion of the emitted water vapor is recovered for use as the water molecules which are injected into the plasma.

10. The method of claim 1 further comprising the step of recovering waste steam to provide the injected water molecules.

11. The method of claim 1 wherein a gas is injected into the plasma concurrently with the water molecules.

12. The method of claim 11 wherein air is also injected into the plasma.

13. The method of claim 11 wherein nitrogen is also injected into the plasma.

14. The method of claim 11 wherein an inert gas is also injected into the plasma.

15. The method of claim 14 wherein the inert gas injected into the plasma is selected from the group consisting of xenon, neon, krypton, helium, argon, and combinations thereof.

16. The method of claim 1 wherein steam is also injected into the plasma.

17. A method of generating hydrogen and oxygen gas, comprising steps of: injecting water molecules into a plasma to dissociate the molecules into a hydrogen species and an oxygen species, separating the hydrogen species from the oxygen species by passing the hydrogen species through a porous membrane having a plurality of pores with a diameter larger than the hydrogen species and smaller than the oxygen species such that only the hydrogen species can permeate through the membrane, and removing the oxygen species and the hydrogen species from the plasma so that the hydrogen species form gaseous hydrogen and the oxygen species form gaseous oxygen.

18. The method of claim 17 wherein the porous membrane is formed as a tube which is disposed within a nonporous tube with a reaction zone being formed between the tubes, and the water molecules are injected into the reaction zone from a first end of the nonporous tube.

19. The method of claim 17 wherein the hydrogen species is passed through a plurality of membranes.

20. The method of claim 17 wherein the membrane is electrically biased.

21. The method of claim 20 wherein the membrane is biased by applying a DC voltage to the membrane.

22. The method of claim 20 wherein the membrane is biased by applying an AC voltage to the membrane.

23. The method of claim 22 wherein the membrane is biased by applying a high frequency voltage to the membrane.

24. A method of generating hydrogen gas and oxygen gas, comprising steps of: injecting water molecules into a plasma to dissociate the molecules into a hydrogen species and an oxygen species, separating the hydrogen species from the oxygen species within the plasma by pumping the oxygen species and the hydrogen species through a converging diverging nozzle to form an exit beam wherein the oxygen species emerges from the nozzle substantially along a core of the beam and the hydrogen species migrates outwardly of the beam, and removing each of the hydrogen species and the oxygen species from the plasma so that the hydrogen species forms gaseous hydrogen and the oxygen species forms gaseous oxygen.

25. A method as set forth in claim 24 wherein the converging diverging nozzle is a Laval nozzle.

26. The method of claim 1 wherein including the step of quenching of the oxygen species and the hydrogen species upon exiting the plasma to prevent recombination thereof.

27. A method a set forth in claim 26 wherein the species are quenched by pumping the oxygen species and the hydrogen species through an expansion nozzle prior to quenching.

28. The method of claim 1 including the step of developing an electrical potential across the plasma, with the potential interacting with different electrical potentials of the hydrogen species and the oxygen species to effect separation.

29. The method of claim 1 including the step of developing a magnetic field across the plasma with the field interacting with different magnetic moments of the hydrogen species and the oxygen species to effect separation.

30. The method of claim 29 including the step of developing an electrical potential across the plasma, with the potential interacting with different electrical potentials of the hydrogen species and the oxygen species to effect separation.

31. The method of claim 1 including the step of introducing a catalyst into the plasma to effect termination of the active species in the hydrogen species and the oxygen species.

32. The method of claim 1 including the step of introducing a homogenous reactant into the plasma to react with the oxygen species to prevent recombination of the oxygen species with the hydrogen species.

33. The method of claim 32 including the step of introducing carbon monoxide such that an OH intermediate combines with the carbon monoxide and results in the production of hydrogen atoms and carbon dioxide.

34. The method of claim 1 wherein a sacrificial component is introduced into the plasma to react with the oxygen species to prevent recombination of the oxygen species with the hydrogen species.

35. The method of claim 34 including the step of introducing carbon such that an OH intermediate combines with the carbon and results in the production hydrogen atoms and carbon monoxide.

36. The method of claim 1 wherein an atomic or molecular component is introduced into the plasma concurrently with the water molecules to inhibit recombination of the oxygen species and the hydrogen species.

37. The method of claim 36 wherein iodine is introduced into the plasma.

38. The method of claim 1 wherein a cryothermic gas selected to be non-reactive with one of the oxygen species and the hydrogen species is introduced into the plasma to shock cool the oxygen species and the hydrogen species to prevent recombination thereof.

39. The method of claim 1 including the steps of recovering energy from the plasma and converting the recovered energy to a useful form.

40. The method of claim 39 wherein the energy is recovered by inducing electrical current in electromagnets placed about the plasma from the electro-magnetic energy of the plasma.

41. The method of claim 39 wherein the energy is recovered by placing a heat exchanger in proximity to the plasma to recover heat energy therefrom.

42. The method of claim 39 wherein the energy is recovered by placing a heat pipe within the plasma to recover heat energy therefrom.

43. The method of claim 39 wherein energy is recovered by placing solar cells in proximity to the plasma to recover light energy therefrom.

44. The method of claim 39 wherein energy is recovered by placing a thermoelectric device in proximity to the plasma to recover electrical energy therefrom.

45. The method of claim 39 wherein energy is recovered by placing a thermoionic device in proximity to the plasma to recover electrical energy therefrom.

46. The method of claim 1 including the steps of injecting the water molecules into a first stream and injecting an inert gas into a second stream, with an angle ranging from 0° to 180° between the streams.

47. The method of claim 1 wherein the plasma is a pulsed plasma.

48. The method of claim 1 wherein the plasma is an oscillating plasma having a controlled frequency.

49. The method of claim 1 wherein the plasma is an oscillating plasma having a variable frequency.

50. The method of claim 1 wherein the plasma is developed at a pressure between 1 mtorr and 1000 atmospheres.

51. The method of claim 1 wherein the plasma is developed at a temperature between 5° C. and 20,000° K.

52. A method of generating hydrogen and oxygen gas, comprising steps of: generating a plasma at a frequency between 50 Hz and 100 gHz, injecting water molecules into the plasma to dissociate the molecules into a hydrogen species and an oxygen species, separating the hydrogen species from the oxygen species within the plasma, and removing each of the oxygen species and the hydrogen species from the plasma so that the hydrogen species form gaseous hydrogen and the oxygen species form gaseous oxygen.

53. The method of claim 1 further comprising the step of introducing a seed material into the plasma to lower the temperature of the plasma.

54. The method of claim 53 wherein the seed material is selected from the group consisting of $CsCO_2$, CsCl, $K_2CO_3$, KOH, KCl, NaCl, NaOH and $Na_2CO_3$.

55. The method of claim 53 wherein the seed material is selected from the group consisting of alkali and alkaline earth metals.

56. The method of claim 53 wherein the seed material is mercury.

57. The method of claim 1 including the step of introducing a catalyst into the plasma to terminate the oxygen species and the hydrogen species and to redirect the oxygen species and the hydrogen species to molecular hydrogen and molecular oxygen.

58. The method of claim 57 wherein the catalyst is selected from the group consisting of silica gel, platinum, salts and metals, zinc chromite, metal oxides, argon, xenon, and other inert gases.

59. A method of generating hydrogen gas and oxygen gas, comprising steps of: injecting water molecules into a plasma to dissociate the molecules into a hydrogen species and an oxygen species, separating the hydrogen species from the oxygen species within the plasma, introducing a silica gel catalyst into the plasma to terminate the dissociation of the water molecules and to redirect the oxygen species and the hydrogen species to molecular hydrogen and molecular oxygen, and removing the molecular hydrogen and the molecular oxygen.

60. A method of generating hydrogen gas and oxygen gas, comprising steps of: injecting water molecules into a plasma to dissociate the molecules into a hydrogen species and an oxygen species, injecting nitrogen into the plasma concurrently with the water molecules such that nitric oxide is formed as a byproduct; separating the hydrogen species from the oxygen species within the plasma, removing each of the hydrogen species and the oxygen species from the plasma so that the hydrogen species forms gaseous hydrogen and the oxygen species forms gaseous oxygen, and injecting an acid post plasma such that the nitric oxide reacts with the acid to form a salt, thereby releasing molecular hydrogen.

61. The method of claim 60 wherein the acid is phosphoric acid.

* * * * *